J. F. O'BYRNE.

NOISELESS CASE FOR NOISY MACHINES.

APPLICATION FILED OCT. 27, 1914.

Reissued Jan. 12, 1915.

13,865.

3 SHEETS—SHEET 1.

Witnesses
William Edgar Goodrich
Annie Stephenson Smith

Inventor
Joseph Francis O'Byrne

J. F. O'BYRNE.

NOISELESS CASE FOR NOISY MACHINES

APPLICATION FILED OCT. 27, 1914.

Reissued Jan. 12, 1915.

13,865.

3 SHEETS—SHEET 2.

Witnesses

William Edgar Gaedke

Annie Stephenson Smith

Inventor

Joseph Francis O'Byrne

J. F. O'BYRNE.

NOISELESS CASE FOR NOISY MACHINES.

APPLICATION FILED OCT. 27, 1914.

Reissued Jan. 12, 1915.

13,865.

3 SHEETS—SHEET 3.

Witnesses
William Edgar Goodin
Annie Stephenson Smith

Inventor
Joseph Francis O'Byrne.

UNITED STATES PATENT OFFICE.

JOSEPH FRANCIS O'BYRNE, OF JARBIDGE, NEVADA.

NOISELESS CASE FOR NOISY MACHINES.

13,865. Specification of Reissued Letters Patent. Reissued Jan. 12, 1915.

Original No. 1,042,957, dated October 29, 1912, Serial No. 614,673. Application for reissue filed October 27, 1914. Serial No. 868,913.

*To all whom it may concern:*

Be it known that I, JOSEPH F. O'BYRNE, a citizen of the United States, residing at Jarbidge, in the county of Elko and State of Nevada, have invented a new Noiseless Case for Noisy Machines, of which the following is a specification.

My invention relates to the absolute removal of all noise connected with such machines as computing machines and typewriters. The essential novelty of my invention is that I remove the noisy medium, air, from around the machine by incasing it in a suitable case, having means for operating the inclosed machine from without, and by a key operated valve connect the case, when closed, to a vacuum chamber which removes the air. In this way I retain all the advantages of the present high standard computing machines and typewriters, but absolutely remove all noise, such as the impact of the keys or the noise caused by any other noise making movements connected with the inclosed machine. I attain these objects by use of a vacuum chamber and the mechanism illustrated in the accompanying drawing, which shows the adaptation for typewriters, in which—

Figures 1, 2:
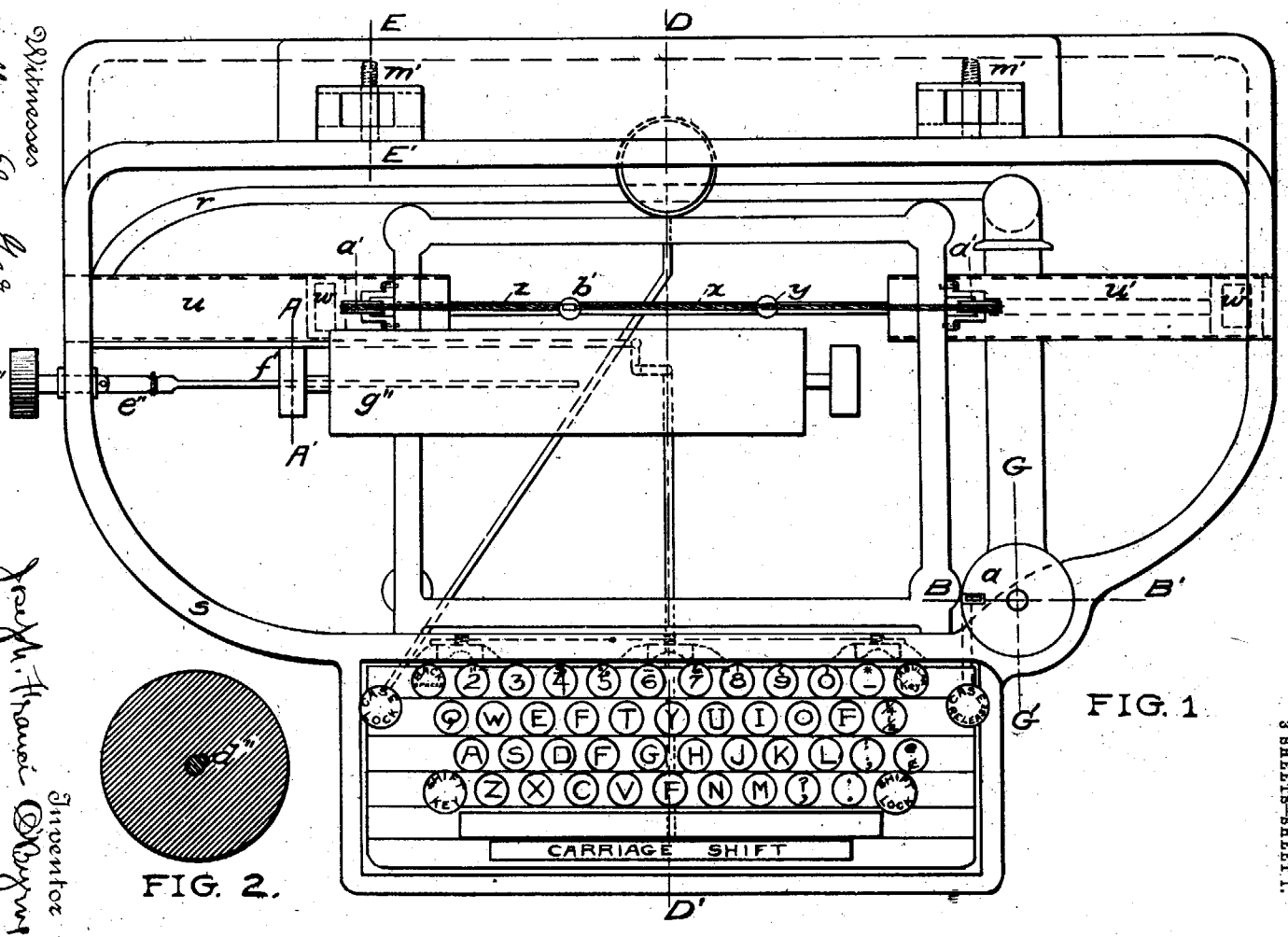
Figure 3:
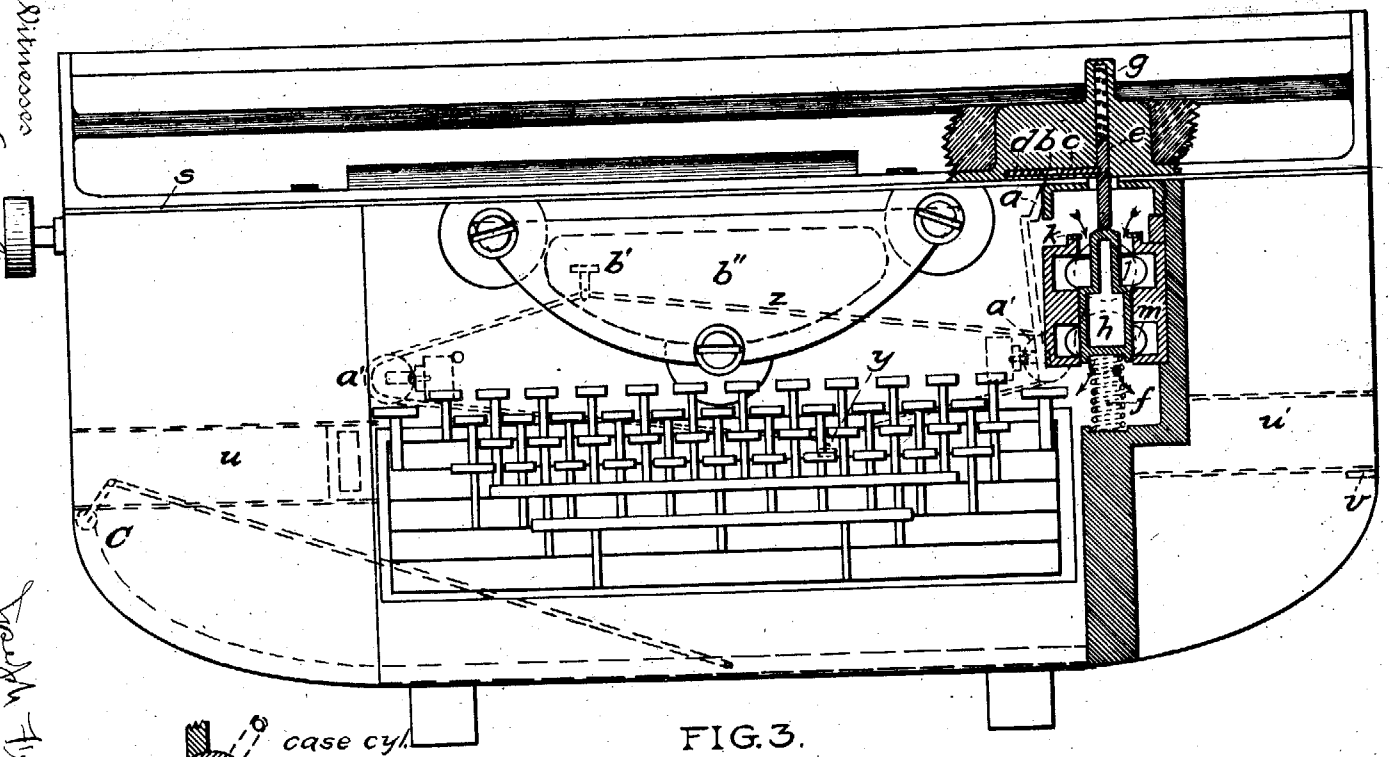
Figure 4:
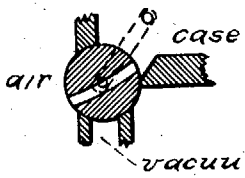
Figures 5, 6:
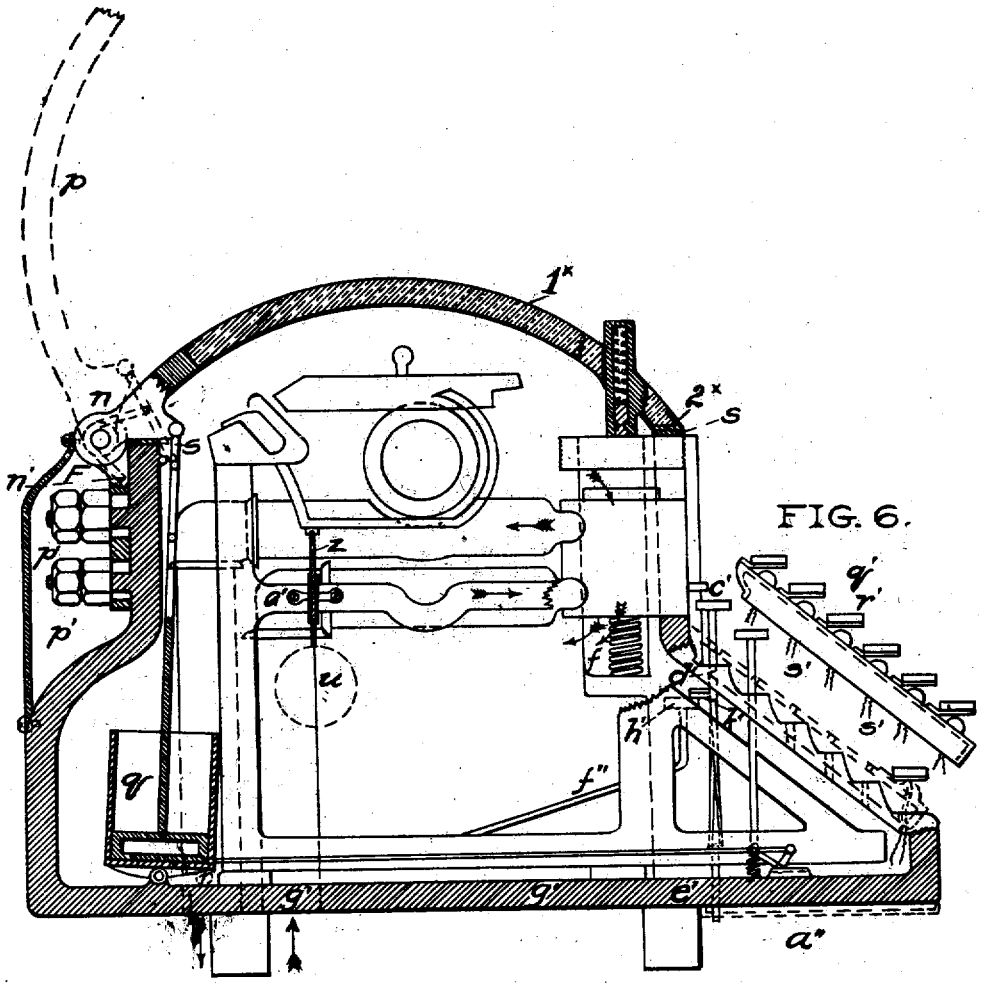

Figure 1 is a plan of the vacuum case with the case cover removed showing the necessary parts of a typewriter. Fig. 2 is an enlarged section taken through A—A′, Fig. 1. Fig. 3 is a front elevation of the case with cover in place. There is also shown at the right hand side, a section taken through B—B′, of Fig. 1. Fig. 4 is an enlarged section taken through the vacuum two way valve shown at C of Fig. 3. Fig. 5 is a side elevation and sections combined of the case and necessary parts of a typewriter. The section of the case is taken through D—D′ of Fig. 1, except the release mechanism and hinge which are taken through G—G′ and E—E′ respectively. Fig. 6 is a side elevation of an auxiliary plate used for operating typewriters which are run by electricity.

Similar letters refer to similar parts through the several views.

To explain the operation of the machine we will assume that the case is closed and that the operator wishes to open it. He presses the key marked "Case release," Fig. 1. This raises the wedge *a*, see section Fig. 3, through the slot *b* in the latch *c* which presses back the spring *d* of this latch. This releases the lock bar *e*, and the spring below the valve *h*, or *f*, which is stronger than the spring above, or *g*, quickly shoves the balanced valve *h* up till it is stopped by the projecting ring *k*. This shuts off the vacuum chamber opening *l* and opens the interior of the case to the atmosphere through *m*, the air coming in, in the direction of the arrows, as shown. The vacuum being broken in the case, the springs in the hinges shown at *n*, Fig. 5, raise the top of the case to the position shown by the broken lines at *p*, Fig. 5. To close the case the operator presses the key marked "Case lock," Fig. 1, which operates a valve at the base of the hinged cylinder *q*, Fig. 5, thus connecting the base of the cylinder with the vacuum chamber through the pipe *r*, Figs. 5 and 1, which causes the piston to suck down due to atmospheric pressure, closing the case to a point at which the lock bar *e*, Fig. 3, depresses the valve *h* and connects the interior of the case with the vacuum chamber. This causes the case to snap securely shut due to atmospheric pressure on the outside of the case cover which pressure makes a firm tight joint around the rubber gasket *s* around the edge of the case. The bar *e* is always locked by the latch *c* after the top of the case moves away far enough so the spring *f* cannot depress the weaker spring *g* through the valve *h*. Having the case closed and wishing to shift the carriage at the end of a line, the operator presses the bar marked "Carriage shift," Fig. 1, which operates the little two way valve shown at C, Fig. 3, see detail Fig. 4, and connects the end of the cylinder *u* with the vacuum chamber through the pipe *r*. The cylinder *u′* is always connected to the atmosphere by the opening *v*, Fig. 3, and the atmospheric pressure drives the piston *w′*, Fig. 1, to the left which motion is communicated to the piston *w*, through the bar *x*, which in turn communicates an opposite motion to the carriage of the typewriter through the flexible cable *z* which runs around the pulleys *a′* and is attached to the carriage at *b′* and to the bar *x* at *y*. Releasing the carriage shift key the valve C connects the end of the cylinder *u* with the atmosphere and the air pressure being equalized the carriage performs its usual motion to the left in spacing. It is easily possible to construct the valve C so that it will remain connected with the vacuum chamber until the carriage has reached the end of its travel to the right, but this might cause the operator to write while the carriage was moving to the right and possibly throw the keys out of alinement, so it was thought best to compel the operator to hold down the carriage shift until the carriage had completed its travel to the right.

From Fig. 5 it will be seen that the case touches the inclosed machine in the rubber cushions upon which the typewriter rests, or $g'$; where the keys communicate motion, or $k'$, and where the platen turning bar $g''$ passes into the platen. The universal joint at $e''$ is of strong rubber, Fig. 1, the key $c'$, Fig. 5, communicates motion to the typewriter key through the rubber cushion $k'$, so no vibration can be transmitted to the case from the machine.

In Fig. 5, F is an adjustable plate having at its top part the spring hinge and spring $n'$ for raising the case cover. The adjustment is made by placing the cover on the case proper and connecting with the vacuum chamber. The pressure of the atmosphere on the gasket $s$ gives the proper fit, after which the lock nuts $p'$ are securely screwed up. The stud bolts as shown are part of the case.

In case the typewriter is one of the electrically operated kind, the gasketed plate shown in Fig. 6 is screwed over the holes in the case, thus making an air tight joint. The wires are pulled through the key holes. There is also a gasketed plate for the bottom as shown at $a''$ Fig. 5.

On the front of the case is a gasketed plate in the shape of a segment, $b''$, Fig. 3, held to the case by thumb screws. The purpose of this plate is to enable the operator to get at the typebars for cleaning.

To turn the platen when the case is closed, there is provided the auxiliary wheel $c''$, Fig. 1, which turns the platen through the strong rubber universal joint $e''$ by means of the feather shown at $d''$ Fig. 2, extending on the shaft $g''$ its whole length. This raised feather engages a slot in the platen rather loosely, so the platen is free to slide back and forth, along the said bar or shaft $g''$. The use of the universal joint is to permit the carriage to move vertically when the shift key for capitals is used.

To enable the operator to see the work, there is provided the glass cover $1^x$, lined or edged with metal $2^x$ for strength.

Having thus described my invention, I claim as new and desire to secure by Letters Patent:

1. In a sound deadening device for machines, a casing having a vacuum chamber, a cover for said casing, means for unlocking said cover, and means for closing said cover, said unlocking and closing means being operated by air pressure.

2. In a sound deadening device for machines, a casing having a vacuum chamber, a cover for said casing, means for unlocking said cover, means for closing said cover, said unlocking and closing means being operated by air pressure, a valve for the unlocking means, a valve for the closing means, and means on the outside of the casing for causing the movement of said valves.

3. An air tight case for typewriters comprising a lower totally inclosing portion with continuous vertical walls terminating in a plane; a gasket upon said walls, in the plane; an adjustable spring hinged cover of strong transparent material bounded by a metal edge terminating in a plane and vacuum means for securing the cover.

4. A totally inclosing operative case for typewriters having a complete keyboard corresponding to an inclosed typewriter keyboard, and said keys having attached rubber cushions for imparting motion to the inclosed typewriter keys; a "case release" key operating an opening device; a "case lock" key operating a closing device; a "carriage shift" key operating a carriage shift device; and a platen turning knob without the case having means for turning the typewriter platen within.

5. In a sound deadening device for typewriters, a casing having a vacuum chamber, a cover for said casing, an auxiliary keyboard disposed on the exterior of said casing, the stems of said keys passing into said casing, means for preventing the escape of air from said casing around the stems, a platen turning knob, a shaft therefor arranged to pass through the casing and having a connection with the platen shaft of the typewriter, and means for preventing the passage of air around said knob shaft.

6. In a sound deadening device for typewriters, a casing inclosing the typewriter and provided with a vacuum chamber, a cover for said casing, means for operating the typewriter keys from the exterior of the casing, means for turning the platen from the exterior of the casing, means for shifting the carriage from the exterior of the casing, and means for preventing the passage of air into or out of the casing.

7. In a typewriter case, a cover, a hinged cylinder at the back and center of the case, a piston in said cylinder connected to the case cover by a jointed rod, a two way valve at the base of the cylinder for connecting the interior of said cylinder with a vacuum chamber or the atmosphere, a case lock key and a system of levers from said valve to said case lock key.

8. In an air tight case for typewriters, a balanced valve, a strong spring below the balanced valve, a notched lock-bar above the balanced valve and in the case cover, a number spring above and for said lock-bar and in said case cover, a latch in said case cover, a spring acting on said latch and adapted to force said latch against said lock-bar and into said notch on said lock-bar, a hole in said latch, a wedge to engage said hole and force said latch back against its spring, a case release key and connections from said wedge to said case release key.

9. In a sound deadening device for typewriters, an inclosing casing provided with a vacuum chamber, a cover therefor, means for shutting off said chamber from the outer atmosphere when the cover is raised, and means for connecting the space within the cover with the vacuum chamber when the cover is closed.

10. The combination of a sound deadening casing, a typewriter therein having a traveling carriage, means operable to return the carriage of the typewriter and means in part exterior to the casing to control said operable means.

11. The combination of a sound deadening casing provided with a movable cover, a machine therein, means to operate said machine, means to move said cover, and means in part exterior to said casing to control the operation of said machine and cover.

12. The combination of a sound deadening casing, a typewriter therein having a carriage to travel wholly within the casing, and operable means to return the carriage.

13. The combination of a sound deadening casing, a typewriter therein having a carriage to travel wholly within the casing, means to return the carriage, and means extending through the casing to actuate the carriage return means.

14. The combination of a sound deadening casing provided with a movable cover, a machine therein, and operable means extending through the casing to operate said machine and move said cover.

JOSEPH FRANCIS O'BYRNE.

Witnesses:
WILLIAM EDGAR GOLDEN,
ANNIE STEPHENSON SMITH.